US011838367B2

(12) United States Patent
Wang et al.

(10) Patent No.: US 11,838,367 B2
(45) Date of Patent: Dec. 5, 2023

(54) INFORMATION ACQUIRING METHOD, APPARATUS, AND SYSTEM

(71) Applicant: Siemens Aktiengesellschaft, Munich (DE)

(72) Inventors: Qi Wang, Wuhan (CN); He Yu, Wuxi (CN); Jun Jie Chen, Wuxi (CN); Wen Jing Zhou, JiangSu (CN); Yue Hua Zhang, Wuhan (CN); Teng Fei Wu, JiangSu (CN); Yang Wang, Wuxi (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/783,447

(22) PCT Filed: Dec. 9, 2019

(86) PCT No.: PCT/CN2019/124102
§ 371 (c)(1),
(2) Date: Jun. 8, 2022

(87) PCT Pub. No.: WO2021/114044
PCT Pub. Date: Jun. 17, 2021

(65) Prior Publication Data
US 2023/0015624 A1 Jan. 19, 2023

(51) Int. Cl.
*H04L 67/12* (2022.01)
(52) U.S. Cl.
CPC ................... *H04L 67/12* (2013.01)
(58) Field of Classification Search
CPC ...................................................... H04L 67/12
See application file for complete search history.

(56) References Cited

U.S. PATENT DOCUMENTS

| 2015/0269383 A1 | 9/2015 | Lang et al. ................. 726/1 |
| 2018/0114140 A1 | 4/2018 | Chen ..................... G06N 99/00 |

(Continued)

FOREIGN PATENT DOCUMENTS

| CN | 109753589 A | 5/2019 | .......... G06F 16/901 |
| CN | 110336845 | 10/2019 | |

(Continued)

OTHER PUBLICATIONS

Search Report for International Application No. PCT/CN2019/124102, 10 pages, dated Sep. 9, 2020.

(Continued)

*Primary Examiner* — Kim T Nguyen
(74) *Attorney, Agent, or Firm* — Slayden Grubert Beard PLLC (57) ABSTRACT

Various embodiments include a method for deploying field device into an Internet of Things (IoT). The method may include: acquiring information from a field device using an edge device; transmitting the acquired information to a cloud platform; wherein the information comprises data and an industrial IoT model; converting the industrial IoT model into a graph; performing similarity analysis based on the graph; classifying the industrial IoT model based on the similarity analysis; generating a first industrial IoT model comprising a type or an example; performing data mapping on the first industrial IoT model; and operating the field device as part of the IoT.

9 Claims, 3 Drawing Sheets

(56) References Cited

U.S. PATENT DOCUMENTS

| | | | |
|---|---|---|---|
| 2019/0042988 A1 | 2/2019 | Brown et al. | |
| 2019/0123959 A1 | 4/2019 | Joshi et al. | |
| 2019/0356556 A1* | 11/2019 | Vicat-Blanc | G06F 30/20 |
| 2020/0412810 A1* | 12/2020 | Knight | H04L 69/18 |

FOREIGN PATENT DOCUMENTS

| | | | |
|---|---|---|---|
| CN | 110414021 | 11/2019 | |
| IN | 201831019081 A | 11/2019 | A01G 251/60 |
| WO | 2019 127502 | 7/2019 | |

OTHER PUBLICATIONS

Hua, Zhang et al., "Design of Information Monitoring System Based on Internet of Things and SOM Algorithm," Computer Measurement & Control, vol. 27, No. 4, p. 84-95 (Chinese w/ English abstract), Apr. 25, 2017.

Yang, Chi et al., "Big-Sensing-Data Curation for the Cloud is Coming: A Promise of Scalable Cloud-Data-Center Mitigation for Next-Generation IoT and Wireless Sensor Networks," IEEE Consumer Electronics Magazine, vol. 6, No. 4, pp. 48-56, Sep. 22, 2017.

Nikolov, Andriy et al., "Combining RDF Graph Data and Embedding Models for an Augmented Knowledge Graph, " The Web Conference 2018, International World Wide Web Conferences Steering Committee, XP058652746, pp. 977-980, Apr. 23, 2018.

Wang, Yazi et al., "A Heterogeneous Graph Embedding Framework for Location-Based Social Network Analysis in Smart Cities," IEEE Transactions on Industrial Informatics, vol. 16, No. 4, pp. 2747-2755, Nov. 15, 2019.

Chinese Office Action, Application No. 201980102674.3, 5 pages, dated May 12, 2023.

Extended European Search Report, Application No. 19955612.7, 8 pages, dated Jul. 12, 2023.

\* cited by examiner

INFORMATION ACQUIRING METHOD, APPARATUS, AND SYSTEM

CROSS-REFERENCE TO RELATED APPLICATIONS

This application is a U.S. National Stage Application of International Application No. PCT/CN2019/124102 filed Dec. 9, 2019, which designates the United States of America, the contents of which are hereby incorporated by reference in their entirety.

TECHNICAL FIELD

The present disclosure relates to the field of industrial Internet of Things (IoT). Various embodiments of the teachings herein may include information acquiring methods, apparatuses, and systems for use in IoT applications.

BACKGROUND

In an industrial Internet of Things system, data is acquired from field systems and transmitted to an industrial cloud, which is a first step to implement a solution of industrial Internet of Things. However, such a first step still requires much manual work. A field side and a cloud need to be configured, including definition of an industrial Internet of Things model for the industrial cloud and configuration of a data source and a data point for the field system.

Currently, the following problems still exist in acquisition of data of industrial Internet of Things. Firstly, prior art further needs to depend on massive manual configuration for the industrial Internet of Things model and the data sources. Secondly, when the field system is complex and there are countless data points, data acquisition is extremely slow and an error is easy to occur. In addition, there is a lack of sufficient communication between an engineer of manual configuration of the field systems and an engineer of a cloud solution. Finally, when the field systems are fully described in an information model, the data points still need to be manually configured, the information model including OPC UA, etc.

In the prior art, some cloud platforms provide a list of industrial Internet of Things models for a user to select, but the user should know which industrial Internet of Things device is connected to the cloud platforms. However, such cloud platforms usually support only an industrial Internet of Things device of a communication language defined by the cloud platforms, and are not applied to an industrial device of other communication protocols.

SUMMARY

As an example, some embodiments of the teachings herein include an information acquiring method, comprising the following: S1: acquiring information from a field device using an edge device and transmitting the information to a cloud platform, wherein the information comprises data and an industrial Internet of Things model; S2: converting the industrial Internet of Things model into a graph, and performing similarity analysis based on the graph; and S3: classifying the industrial Internet of Things model based on the similarity analysis, generating a first industrial Internet of Things model comprising a type or an example, and performing data mapping on the first industrial Internet of Things model.

In some embodiments, the step S2 further comprises the following: S21: converting the graph into a vector and loading the vector with an algorithm, to convert the graph into a digital description; S22: performing the similarity analysis on the vector and ranking the vector, and extracting the type of the industrial Internet of Things model; and S23: storing a same type of the industrial Internet of Things model.

In some embodiments, the algorithm is a random walk algorithm.

In some embodiments, an order in which the graph is analyzed using the random walk algorithm is based on the following rules: selecting adjacent nodes starting from most edge nodes of the graph, and selecting nodes whose quantity is a preset threshold; selecting only a node except the most edge nodes of the graph; and collecting the nodes whose quantity is the preset threshold starting from the most edge nodes of the graph, and, when the nodes are collected again, selecting nodes on a layer of the graph and selecting nodes whose quantity is larger than the preset threshold.

As another example, some embodiments include an information acquiring system comprising: a processor; and a memory coupled to the processor, the memory having an instruction stored therein, the instruction, when executed by the processor, causing the electronic device to perform an action, the action comprising: S1: acquiring information from a field device using an edge device and transmitting the information to a cloud platform, wherein the information comprises data and an industrial Internet of Things model; S2: converting the industrial Internet of Things model into a graph, and performing similarity analysis based on the graph; and S3: classifying the industrial Internet of Things model based on the similarity analysis, generating a first industrial Internet of Things model comprising a type or an example, and performing data mapping on the first industrial Internet of Things model.

In some embodiments, the step S2 further comprises the following actions: S21: converting the graph into a vector and loading the vector with an algorithm, to convert the graph into a digital description; S22: performing the similarity analysis on the vector and ranking the vector, and extracting the type of the industrial Internet of Things model; and S23: storing a same type of the industrial Internet of Things model.

In some embodiments, the algorithm is a random walk algorithm.

In some embodiments, an order in which the graph is analyzed using the random walk algorithm is based on the following rules: selecting adjacent nodes starting from most edge nodes of the graph, and selecting nodes whose quantity is a preset threshold; selecting only a node except the most edge nodes of the graph; and collecting the nodes whose quantity is the preset threshold starting from the most edge nodes of the graph, and, when the nodes are collected again, selecting nodes on a layer of the graph and selecting nodes whose quantity is larger than the preset threshold.

As another example, some embodiments include an information acquiring apparatus comprising: an information acquiring apparatus configured to: acquire information from a field device using an edge device and transmit the information to a cloud platform, wherein the information comprises data and an industrial Internet of Things model; a converting and analyzing apparatus configured to: convert the industrial Internet of Things model into a graph, and perform similarity analysis based on the graph; and a classification generating apparatus configured to: classify the industrial Internet of Things model based on the similarity analysis, generate a first industrial Internet of Things model comprising a type or an example, and perform data mapping on the first industrial Internet of Things model.

As another example, some embodiments include a computer program product tangibly stored on a computer readable medium and comprising a computer executable instruction that, when executed, causes at least one processor to perform one or more of the methods described herein.

As another example, some embodiments include a computer readable medium storing a computer executable instruction that, when executed, causes a processor to perform one or more of the methods described herein.

DETAILED DESCRIPTION

During data acquisition, an existing model on a device side is not required for configuration of the industrial Internet of Things model, and debugging work may be reduced by applying teachings of the present disclosure. The device side automatically extracts the industrial Internet of Things model and generates the industrial Internet of Things model on the cloud platform without depending on knowledge of a person skilled in the art. The industrial Internet of Things model generating information about the device side and a graph database may be reused in other application scenarios. In addition, a device side model may converted into a node graph and the node graph is stored in a graph database for subsequent applications in different application scenarios. Graph embedding and definition of a random walk calculation rule of the device side model may be suitable for features of an industrial system. In some embodiments, the configuration-free cloud platform is integrated with the device side, so that difficulty in establishing an industrial Internet of Things solution is reduced. The integration and knowledge conversion from the device side to the cloud platform enhance capability and functionality of the cloud platform.

Some embodiments of the teachings herein include an information acquiring method, including the following: S1: acquiring information from a field device using an edge device and transmitting the information to a cloud platform, where the information includes data and an industrial Internet of Things model; S2: converting the industrial Internet of Things model into a graph, and performing similarity analysis based on the graph; and S3: classifying the industrial Internet of Things model based on the similarity analysis, generating a first industrial Internet of Things model including a type or an example, and performing data mapping on the first industrial Internet of Things model.

In some embodiments, the step S2 further includes the following steps: S21: converting the graph into a vector and loading the vector with an algorithm, to convert the graph into a digital description; S22: performing the similarity analysis on the vector and ranking the vector, and extracting the type of the industrial Internet of Things model; and S23: storing a same type of the industrial Internet of Things model.

In some embodiments, the algorithm is a random walk algorithm.

In some embodiments, an order in which the graph is analyzed using the random walk algorithm is based on the following rules: selecting adjacent nodes starting from most edge nodes of the graph, and selecting nodes whose quantity is a preset threshold; selecting only a node except the most edge nodes of the graph; and collecting the nodes whose quantity is the preset threshold starting from the most edge nodes of the graph, and, when nodes are collected again, selecting nodes on a layer of the graph and selecting nodes whose quantity is larger than the preset threshold.

Some embodiments include an information acquiring system, including a processor; and a memory coupled to the processor, the memory having an instruction stored therein, the instruction, when executed by the processor, causing the electronic device to perform an action, the action including: S1: acquiring information from a field device using an edge device and transmitting the information to a cloud platform, the information including data and an industrial Internet of Things model; S2: converting the industrial Internet of Things model into a graph, and performing similarity analysis based on the graph; and S3: classifying the industrial Internet of Things model based on the similarity analysis, generating a first industrial Internet of Things model including a type or an example, and performing data mapping on the first industrial Internet of Things model.

In some embodiments, the action S2 further includes the following actions: S21: converting the graph into a vector and loading the vector with an algorithm, to convert the graph into a digital description; S22: performing the similarity analysis on the vector and ranking the vector, and extracting the type of the industrial Internet of Things model; and S23: storing a same type of the industrial Internet of Things model.

In some embodiments, the algorithm is a random walk algorithm.

In some embodiments, an order in which the graph is analyzed using the random walk algorithm is based on the following rules: selecting adjacent nodes starting from most edge nodes of the graph, and selecting nodes whose quantity is a preset threshold; selecting only a node except the most edge nodes of the graph; and collecting the nodes whose quantity is the preset threshold starting from the most edge nodes of the graph, and, when nodes are collected again, selecting nodes on a layer of the graph and selecting nodes whose quantity is larger than the preset threshold.

Some embodiments include an information acquiring apparatus, including an information acquiring apparatus configured to: acquire information from a field device using an edge device and transmit the information to a cloud platform, the information including data and an industrial Internet of Things model; a converting and analyzing apparatus configured to: convert the industrial Internet of Things model into a graph, and perform similarity analysis based on the graph; and a classification generating apparatus configured to: classify the industrial Internet of Things model based on the similarity analysis, generate a first industrial Internet of Things model including a type or an example, and perform data mapping on the first industrial Internet of Things model.

Some embodiments include a computer program product tangibly stored on a computer readable medium and including a computer executable instruction that, when executed, causes a processor to perform one or more of the methods described herein.

Some embodiments include a computer readable medium storing a computer executable instruction that, when executed, causes a processor to perform one or more of the methods described herein.

The teachings of the present disclosure include a model-analysis based industrial Internet of Things model and a data information acquiring mechanism, which provides zero configuration for an industrial Internet of Things model and data acquisition. In some embodiments, an existing industrial Internet of Things model in a field system is used, and the industrial Internet of Things model does not need to be configured in a data acquisition process, so that a manual debugging workload can be greatly reduced. In some embodiments, the industrial Internet of Things model may be automatically extracted from the field system, and the industrial Internet of Things model is established in a cloud system without depending on practical knowledge of an expert of the field system. In some embodiments, the industrial Internet of Things model and a graph database are established for the field system, and the industrial Internet of Things model and the graph database can be reused.

Figure 1:
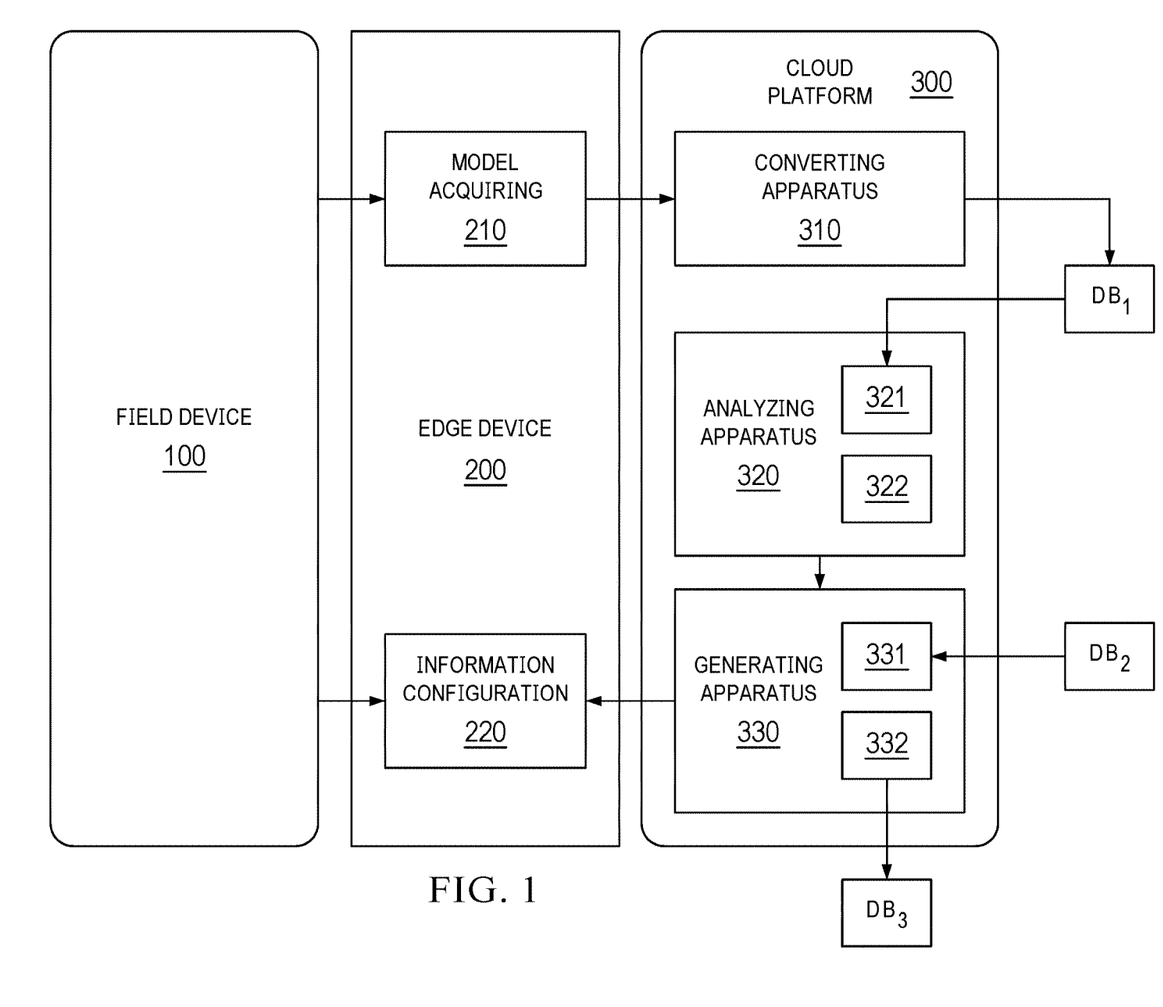
FIG. 1 is a schematic structural diagram of an information acquiring system incorporating teachings of the present disclosure.

FIG. 1 is a schematic structural diagram of an example embodiment an information acquiring system incorporating teachings of the present disclosure. As shown in FIG. 1, the information acquiring system includes a field device 100, an edge device 200, and a cloud platform 300. The field device 100 and the edge device 200 are exemplarily disposed at a production line end of a factory, and the edge device 200 is connected to the field device 100 and the cloud platform 300 respectively. In some embodiments, data is collected from the field device 100 using the edge device 200, and an industrial Internet of Things model is simultaneously established in the cloud platform. The cloud platform is an industrial cloud platform. The edge device 200 includes a model acquiring apparatus 210 and an information configuration apparatus 220. A converting apparatus 310, an analyzing apparatus 320, and a generating apparatus 330 are disposed in the cloud platform 300.

The information acquiring method may include step S1, step S2, and step S3. In S1, information is acquired from the field device 100 using the edge device 200 and transmitted to the cloud platform 300. The information includes existing data and industrial Internet of Things models stored on a field device side 100.

In some embodiments, teachings of the present disclosure are applied to an industrial device system that supports a predefined information model, such as an OPC UA network and a BAC network. Therefore, the edge device 200 may acquire a system information model from the field device side 100. In particular, the model acquiring apparatus 210 in the edge device 200 is configured to: acquire and transmit the industrial Internet of Things model to the cloud platform 300, and the data configuration apparatus 220 in the edge device 200 is configured to: acquire data and transmit the data to the cloud platform 300, and perform information configuration on a final industrial Internet of Things model subsequently established in the cloud platform 300.

The edge device 200 converts a system model into a model in a unified format and transmits the model in a unified format to the cloud platform 300, such as a JSON format and an XML format. The information configuration apparatus 220 is configured to perform data acquiring configuration, including: generating a data source, a data point, and data mapping using a service, and downloading the data source, the data point and the data mapping to the edge device 200. The information configuration apparatus 220 collects data of the field device 100 based on required configuration and transmits the data to the cloud platform 300.

Step S2 may include using the converting apparatus 310 in the cloud platform 300 to convert the industrial Internet of Things model into a graph, and the analyzing apparatus 320 in the cloud platform 300 performs similarity analysis based on the graph. In particular, the cloud platform 300 performs model analysis to automatically generate industrial Internet of Things model of a system, and classifies the model. The graph is stored in a first database DB1.

In some embodiments, step S2 further includes a substep S21, a substep S22 and a substep S23. In the substep S21, the converting apparatus 310 converts the graph into a vector and loads the vector with an algorithm, to convert the graph into a digital description.

Figure 2:
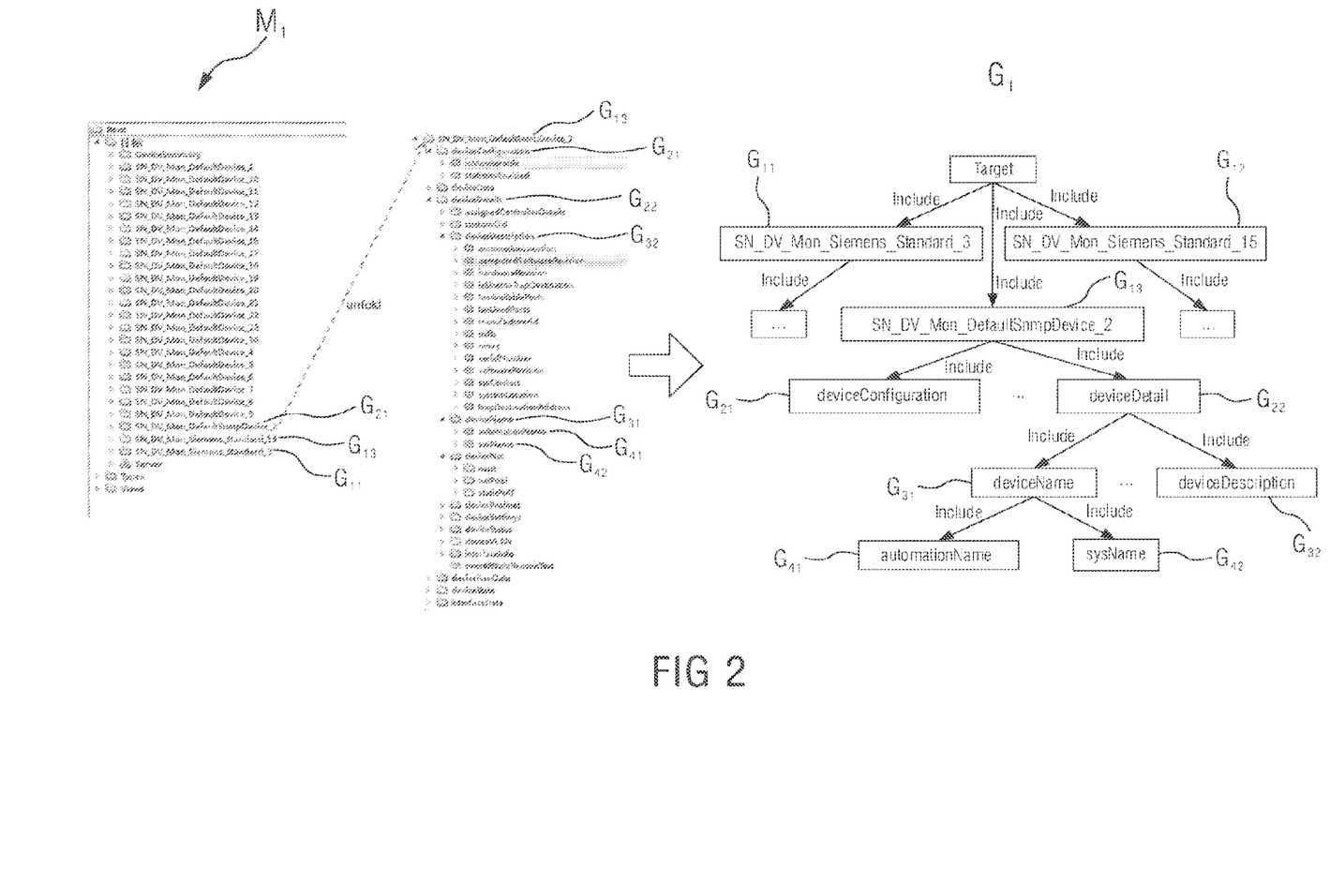
FIG. 2 is a schematic diagram of converting an industrial Internet of Things model into a graph incorporating teachings of the present disclosure.

FIG. 2 is a schematic diagram of an example embodiment for converting an industrial Internet of Things model into a graph. As shown in FIG. 2, the industrial Internet of Things model M1 is specifically a field system model. In order to subsequently provide a flexible graph query and a random walk algorithm, the industrial Internet of Things model M1 is converted into a graph G1 and stored in the first database DB1. The graph G1 is described in a semantic description language, such as RDF or a performance graph. In this embodiment, the industrial Internet of Things model M1 is an OPC-UA model, that is, software of field device network management, and the industrial Internet of Things model M1 includes a device in a network and details thereof. Correspondingly, a node and a relationship of the graph G1 have information about all OPC-UA models.

As shown in FIG. 2, the industrial Internet of Things model M1 refers to an OPC UA tree structure model, and the industrial Internet of Things model M1 is converted into the graph G1 in step S21. In particular, a target folder of the industrial Internet of Things model M1 includes a plurality of targets. The first-layer target has, for example, a first node G11 "SN_DV_Mon_Siemens_3", a second node G12 "SN_DV_Mon_Siemens_15", a third node G13 "SN_DV_DefaultSnmpDevice_2", and the like. The third node G13 "SN_DV_DefaultSnmpDevice_2" has a second-layer target including a fourth node G21 "deviceConfiguration", a fifth node G22 "deviceDetail", and the like. Further, the fifth node G22 "deviceDetail" further includes a sixth node G31 "deviceName" and a seventh node G32 "deviceDescription", and the sixth node G31 "deviceName" further includes an eighth node G41 "automationName" and a ninth node G42 "sysName".

In some embodiments, the industrial Internet of Things model M1 is converted into the graph G2 shown in FIG. 2. A target of the graph includes nodes in a plurality of layers. Nodes in a fourth layer include the first node G11 "SN_DV_Mon_Siemens_3", the second node G12 "SN_DV_Mon_Siemens_15", the third node G13 "SN_DV_DefaultSnmpDevice_2", and the like. Nodes in a third layer include the fourth node G21 "deviceConfiguration", the fifth node G22 "deviceDetail", and the like, nodes in a first layer include the sixth node G31 "deviceName" and the seventh node G32 "deviceDescription", and nodes in a first layer include the eighth node G41 "automationName" and the ninth node G42 "sysName". A relationship among the third node G13 "SN_DV_DefaultSnmpDevice_2", the fourth node G21 "deviceConfiguration" and the fifth node G22 "deviceDetail" is as follows: the third node G13 "SN_DV_DefaultSnmpDevice_2" includes the fourth node G21 "deviceConfiguration" and the fifth node G22 "deviceDetail". A relationship among the fifth node G22 "deviceDetail", the sixth node G31 "deviceName" and the seventh node G32 "deviceDescription" is as follows: the fifth node G22 "deviceDetail" includes the sixth node G31 "deviceName" and the seventh node G32 "deviceDescription". A relationship among the sixth node G31 "deviceName", the eighth node G41 "automationName" and the ninth node G42 "sysName" is as follows: the sixth node G31 "deviceName" includes the eighth node G41 "automationName" and the ninth node G42 "sysName".

In order to analyze similarity of all graph node contents, vector information in the graph may be used, including vector information of each node and some graph fragments. In some embodiments, a graph embedding apparatus 321 in the analyzing apparatus 320 is configured to: perform graph embedding and download a graph from the first database DB1.

Vectorization is first performed on a node, and each node is represented using a vector, including a node name, a node type, and information about the node type. In a common graph embedding algorithm, a node is generally a word without any structure. However, in the graph of this embodiment, a node is generally a target, such as a variable and a folder, so that the most important parameter may be selected to represent a unique node. Because a repeating structure/context in a graph needs to be extracted, a type-related parameter rather than a unique identifier of a node needs to be embedded.

Figure 3:
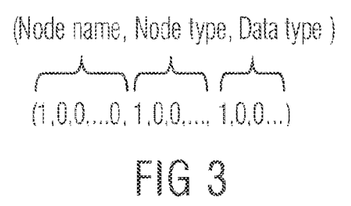
FIG. 3 is a schematic diagram of vectorization of a graph node incorporating teachings of the present disclosure.

As shown in FIG. 3, in this embodiment, one-hot encoding may be used to generate a vector that represents a node. In other words, variables such as a node name, a node type and a data type of each node in the graph are mapped to a vector, to represent different node types as different vectors. It may be understood that different node names represent different vectors. As shown in FIG. 3, in this embodiment, a node name of a node becomes a vector "1, 0, 0, . . . 0" using the one-hot encoding, a node type of a node becomes a vector "1, 0, 0, . . . " using the one-hot encoding, and a data type of a node becomes a vector "1, 0, 0, . . . " using the one-hot encoding.

In the substep S22, a similarity analysis ranking apparatus 322 is configured to: perform similarity analysis on the vector and rank the vector, and extract the type of the industrial Internet of Things model.

In some embodiments, random vectorization is performed on the graph. The algorithm is a random walk algorithm, such as DeepWalk and node2vec. The random walk algorithm is used to analyze context similarity of a node, the context of the node representing an aspect in the industrial Internet of Things model or a structure of a type of assets. In the present invention, the random walk algorithm and some rules of labelling the graph are defined. In the present embodiment, a domain system model is a hierarchical structure, and a node in an upper layer is more like a folder in a node in a lower layer, so that label rules should be suitable for these scenarios, that is, a combination of nodes is selected according to the rules, and then a value of the combination is calculated.

In some embodiments, a first rule is: Adjacent nodes are selected starting from most edge nodes of the graph, and a node whose quantity is a preset threshold is selected.

In some embodiments, a second rule is: a node except the most edge nodes of the graph is only selected, the most edge nodes of the graph being, for example, the "target" in the graph G1.

In some embodiments, a third rule is: the nodes whose quantity is the preset threshold are collected starting from the most edge nodes of the graph, and nodes on a layer of the graph are selected again. When the nodes are collected again, the nodes on a layer of the graph and whose quantity is larger than the preset threshold are selected. For example, 3 nodes are collected for the first time, and 10 nodes are collected for the second time, that is, both a minimum combination and a maximum combination are considered, and a quantity collected each time in each layer is larger than a quantity collected last time. In particular, N(i) represents a quantity of nodes of each sampling, i representing sampling times, so that $N(1)<N(2)< \ldots <N(x-1)<N(x)$.

As shown in FIG. 2, if a node of the graph G1 is sampled for the first time, for example, starting from a node in a second layer, the sixth node G31 "deviceName" is selected as a first starting node, and a node in a lower layer below G31 "deviceName" is regarded as a context and a collection result of the starting node. During first collection, three nodes are collected, that is, first sampled nodes of the graph G1 include the sixth node G31 "deviceName", the eighth node G41 "automationName" and the ninth node G42 "sysName". Afterwards, node sampling is performed for the second time, and nodes and performance are sampled from a next layer of first sampling, including nodes in a lower layer. The sixth node G31 "deviceName" is selected as a starting node, so that a node in a lower layer of G31 "deviceName" is a context of the starting node. However, 5 nodes are selected, that is, the 5 nodes are more than nodes sampled for the first time, including the sixth node G31 "deviceName", the eighth node G41 "automationName", the ninth node G42 "sysName", the seventh node G32 "deviceDescription" and the fifth node G22 "deviceDetail".

After each collection of the node of the graph, a result is input into a random walk algorithm to obtain a set of vectors, the algorithm including DeepWalk or node2vec. For graph node sampling performed each time, a starting node has a set of sample nodes and vectors of the nodes. Output of the algorithm is a vector for each starting node that represents a similarity of a context of each node. Algorithm calculation is performed after each node walk and sampling, so that a similarity between different nodes in different layers in the graph may be acquired. After node context similarity is calculated, repeating structures existing in a graph may be learned. It is assumed that repeating structures in a graph include, as shown in FIG. 2, the sixth node G31 "deviceName", the fifth node G22 "deviceDetail" and a node structure in a lower layer that are repeated for a plurality of times in the graph G1, which are regarded as aspects of the industrial Internet of Things model.

In the substep S23, a same type of the industrial Internet of Things model is stored.

In some embodiments, step S3 includes using a classification apparatus 331 for the industrial Internet of Things model of the generating apparatus 330 configured to: classify the industrial Internet of Things model based on the similarity analysis, generate, using an industrial Internet of Things generating apparatus 332, a first industrial Internet of Things model including a type or an example, and perform data mapping on the first industrial Internet of Things model. The generating apparatus 330 acquires data configuration of the industrial Internet of Things model from the data configuration apparatus 220.

In some embodiments, classification may be performed according to a ratio of a word to an industrial vocabulary. The classification apparatus 331 invokes the industrial vocabulary from a second database DB2. In the foregoing steps, aspects or device of the industrial internet of Things model are acquired from model analysis. Therefore, if the industrial Internet of Things model can be classified, classification of the industrial Internet of Things model helps a customer reuse the industrial Internet of Things model and helps perform analysis for better calculation. In particular, an industrial classification database is first constructed, that is, a standard classification word is used as a basis of the database, the industrial classification database defining a type, a name, a structure and a semantic model. Synonyms or related words are collected using a word dictionary service, and then an extended classification word may be obtained. Then, a node name is segmented, that is, a name of the aspects or the device is segmented using a word segmentation tool. Finally, statistics of a name and classification of the aspects or the device are collected, that is, retrieving is performed in a classification word, and searching is performed in a most probable classification asset name, so that the aspects or the device may be classified in this type.

In this step, each type is labelled for subsequent searching, for example, if a name in the industrial vocabulary is a robot or a machine tool, a claw of a robot is labelled as a robot type.

In some embodiments, in this step, an industrial Internet of Things model is established in a cloud platform 300 based on the aspects and the device extracted in the foregoing steps. An aspects type, a device type, and a device are created in the cloud platform 300.

In some embodiments, data acquiring configuration is performed based on an original system data model, and a device group is generated.

An example embodiment of an industrial Internet of Things model is illustrated below:

| Variable type | Device type | | Device example |
|---|---|---|---|
| Name: deviceName | Name: deviceDetail | Name: device | SN_DV_Mon_DefaultSnmpDevice_2: Asset Type: device |
| Parameter: automationName | Variable: deviceName | Type of a secondary device: deviceDetail | SN_DV_Mon_Siemens_Standard_3: Asset Type: device |
| Parameter: sysName | Parameter: deviceDescription | Type of a secondary device: deviceConfiguration | SN_DV_Mon_Siemens_Standard_15: Asset Type: device |
| . . . | . . . | . . . | . . . |

The data configuration apparatus 220 of the edge device 200 downloads data acquiring configuration to collect information from the device side 100. The generated aspects or devices may be used in this case and are also reused in next generation of the industrial Internet of Things model. A same type should not be generated twice in a same environment of the cloud platform 300.

An industrial Internet of Things generating apparatus 332 stores the generated industrial Internet of Things model in a third database DB3.

In some embodiments, an information acquiring system includes: a processor; and a memory coupled to the processor, the memory having an instruction stored therein, the instruction, when executed by the processor, causing the electronic device to perform an action, the action including: S1: acquiring information from a field device using an edge device and transmitting the information to a cloud platform, the information including data and an industrial Internet of Things model; S2: converting the industrial Internet of Things model into a graph, and performing similarity analysis based on the graph; and S3: classifying the industrial Internet of Things model based on the similarity analysis, generating a first industrial Internet of Things model including a type or an example, and performing data mapping on the first industrial Internet of Things model.

In some embodiments, the action S2 further includes the following actions: S21: converting the graph into a vector and loading the vector with an algorithm, to convert the graph into a digital description; S22: performing the similarity analysis on the vector and ranking the vector, and extracting the type of the industrial Internet of Things model; and S23: storing a same type of the industrial Internet of Things model.

In some embodiments, the algorithm is a random walk algorithm.

In some embodiments, an order in which the graph is analyzed using the random walk algorithm is based on the following rules: selecting adjacent nodes starting from most edge nodes of the graph, and selecting nodes whose quantity is a preset threshold; selecting only a node except the most edge nodes of the graph; and collecting the nodes whose quantity is the preset threshold starting from the most edge nodes of the graph, and, when nodes are collected again, selecting nodes on a layer of the graph and selecting nodes whose quantity is larger than the preset threshold.

In some embodiments, an information acquiring apparatus includes: an information acquiring apparatus configured to: acquire information from a field device using an edge device and transmit the information to a cloud platform, the information including data and an industrial Internet of Things model; a converting and analyzing apparatus configured to: convert the industrial Internet of Things model into a graph, and perform similarity analysis based on the graph; and a classification generating apparatus configured to: classify the industrial Internet of Things model based on the similarity analysis, generate a first industrial Internet of Things model including a type or an example, and perform data mapping on the first industrial Internet of Things model.

In some embodiments, a computer program product is tangibly stored on a computer readable medium and includes a computer executable instruction that, when executed, causes a processor to perform one or more of the methods described herein.

In some embodiments, a computer readable medium stores a computer executable instruction that, when executed, causes a processor to perform one or more of the methods described herein.

During data acquisition, an existing model on a device side is not required for configuration of the industrial Internet of Things model, and debugging work may be reduced in the present invention.

The device side automatically extracts the industrial Internet of Things model and generates the industrial Internet of Things model on the cloud platform without depending on knowledge of a person skilled in the art. The industrial Internet of Things model generating information about the device side and a graph database may be reused in other application scenarios. In addition, in the present invention, a device side model is converted into a node graph and the node graph is stored in a graph database for subsequent applications in different application scenarios. Graph embedding and definition of a random walk calculation rule of the device side model may be suitable for features of an industrial system. In the present invention, the configuration-free cloud platform is integrated with the device side, so that difficulty in establishing an industrial Internet of Things solution is reduced. The integration and knowledge conversion from the device side to the cloud platform enhance capability and functionality of the cloud platform.

Although the teachings herein have been described in detail through the above example embodiments, it should be understood that the above description should not be considered as a limitation on the scope of the present disclosure. For those skilled in the art, various modifications and replacements will be apparent after reading the above content. In addition, any reference numerals in the claims shall not be construed as limiting the scope; the word "include/comprise" does not exclude apparatuses or steps not listed in other claims or the specification; the words such as "first" and "second" are only used to indicate names, and do not indicate any particular order.

What is claimed is:

1. A method for deploying field device into an Internet of Things (IoT), the method comprising:
   acquiring information from a field device using an edge device;
   transmitting the acquired information to a cloud platform;
   wherein the information comprises data and an industrial IoT model;
   converting the industrial IoT model into a graph;
   performing similarity analysis based on the graph;
   classifying the industrial IoT model based on the similarity analysis;
   generating a first industrial IoT model comprising a type or an example;
   performing data mapping on the first industrial IoT model; and
   operating the field device as part of the IoT.

2. The method according to claim 1, further comprising:
   converting the graph into a vector;
   loading the vector with an algorithm to convert the graph into a digital description;
   performing the similarity analysis on the vector;
   ranking the vector;
   extracting the type of the industrial IoT model; and
   storing the type of the industrial IoT model.

3. The method according to claim 1, wherein the algorithm comprises a random walk algorithm.

4. The method according to claim 3, wherein an order in which the graph is analyzed using the random walk algorithm is determined by:
   selecting adjacent nodes starting from most edge nodes of the graph;
   selecting nodes whose quantity is a preset threshold;
   selecting only a node except the most edge nodes of the graph; and
   collecting the nodes whose quantity is the preset threshold starting from the most edge nodes of the graph, and, when the nodes are collected again, selecting nodes on a layer of the graph and selecting nodes whose quantity is larger than the preset threshold.

5. An information acquiring system comprising:
   a processor; and
   a memory coupled to the processor, the memory having an instruction stored therein, the instruction, when executed by the processor, causing the system to:
   acquire information from a field device using an edge device;
   transmit the information to a cloud platform, wherein the information comprises data and an industrial Internet of Things (IoT) model;
   convert the industrial IoT model into a graph;
   perform similarity analysis based on the graph;
   classify the industrial IoT model based on the similarity analysis;
   generate a first industrial IoT model comprising a type or an example; and
   perform data mapping on the first industrial IoT model.

6. The information acquiring system according to claim 5, wherein the electronic device further:
   converts the graph into a vector;
   loads the vector with an algorithm to convert the graph into a digital description;
   performs the similarity analysis on the vector;
   ranks the vector;
   extracts the type of the industrial IoT model; and
   stores the type of the industrial IoT model.

7. The information acquiring system according to claim 6, wherein the algorithm comprises a random walk algorithm.

8. The information acquiring system according to claim 7, wherein an order in which the graph is analyzed using the random walk algorithm is determined by:
   selecting adjacent nodes starting from most edge nodes of the graph and selecting nodes whose quantity is a preset threshold;
   selecting only a node except the most edge nodes of the graph; and
   collecting the nodes whose quantity is the preset threshold starting from the most edge nodes of the graph, and, when the nodes are collected again, selecting nodes on a layer of the graph and selecting nodes whose quantity is larger than the preset threshold.

9. An information acquiring system comprising:
   an information acquiring apparatus configured to: acquire information from a field device using an edge device and transmit the information to a cloud platform, wherein the information comprises data and an industrial Internet of Things (IoT) model;
   a converting and analyzing apparatus configured to: convert the industrial IoT model into a graph and perform similarity analysis based on the graph; and
   a classification generating apparatus configured to: classify the industrial IoT model based on the similarity analysis, generate a first industrial IoT model comprising a type or an example, and perform data mapping on the first industrial IoT model.

* * * * *